United States Patent Office 2,886,839
Patented May 19, 1959

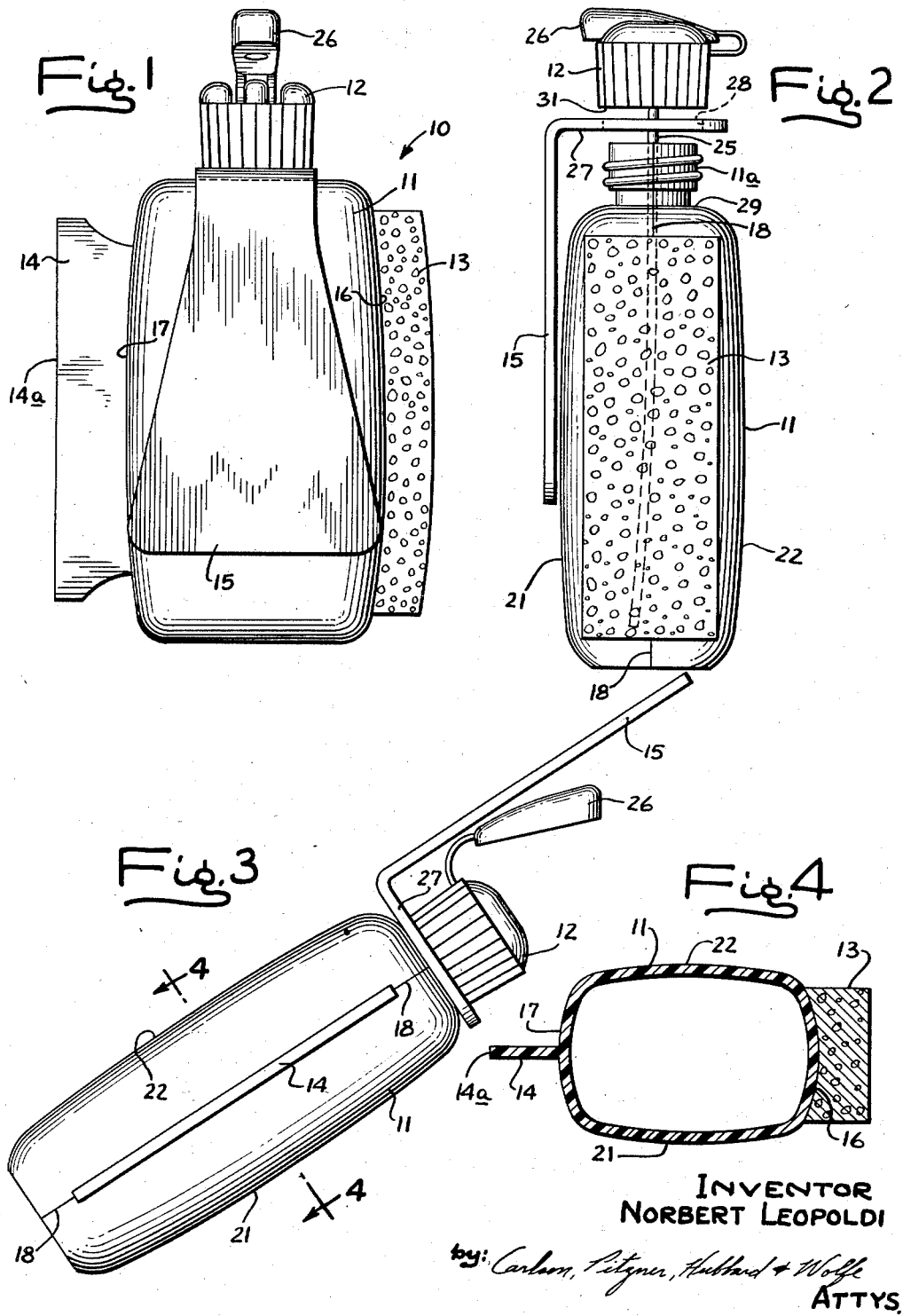

2,886,839

WINDOW CLEANING DEVICE

Norbert Leopoldi, Chicago, Ill., assignor to Nordette, Inc., Chicago, Ill., a corporation of Illinois Application September 27, 1957, Serial No. 686,753

3 Claims. (Cl. 15—126)

The present invention relates to cleaning devices and more particularly to a portable, self-contained unit primarily adapted for window cleaning.

It is the general aim of the invention to provide a novel, self-contained, window cleaning device that is compact, light and extremely portable while offering an operator a variety of cleaning expedients effective for almost all cleaning problems.

With more particularity, it is an object to provide a device of the above type capable of affording the operator the use of a cleaning fluid spray, a sponge, a squeegee and a rigid scraper.

In still more detail, it is an object to provide a compressible container of a novel type adapted for effectively serving as a handle for cleaning elements mounted thereon. It is a related object to provide a device of the type characterized above which makes use of a novel, rigid scraper arranged for serving not only a scraper function, but alternatively as a means for permitting the compressible container to function as a supporting handle for devices requiring rigidity of support for effective operation.

It is another object to provide an effectively operating device of the type described above that can be simply and economically formed so that it may serve as an inexpensive, but useful, advertising novelty.

Other objects and advantages of the invention will become apparent upon reading the attached detailed description and upon reference to the drawings in which:

Figure 1 is an elevation of a device embodying the invention.

Fig. 2 is an exploded elevation of the units comprising the device shown in Fig. 1.

Fig. 3 is a side elevation of the device shown in Fig. 1 with the scraper plate reversed and in scraping position.

Fig. 4 is a transverse section taken along the line 4—4 in Fig. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to Figures 1 and 2, there is shown an illustrative cleaning device 10 embodying the present invention, comprising a compressible container 11, having a neck portion 11a carrying a removable spray top 12, and adapted to serve as a handle for a sponge 13, squeegee 14, and scraper 15, all mounted on the container. In the preferred embodiment, the container is shaped as a rather flat bottle having two narrow sides 16, 17, and is molded of a resilient plastic material with the mold parting line 18 being located around the opposite narrow sides of the bottle. It has been found that polyethylene makes a suitable material from which to form the container.

It will be noted that by forming the container with narrow sides 16, 17, and by locating the parting line 18 down the middle of these sides, that these opposite portions of the container are relatively more stiff and rigid than the adjoining flat container sides 21, 22. The parting line 18 contributes to this effect since it inherently results in a slightly thickened ridge being formed on the outer surface of the molded container.

As a feature of the invention embodied in the device 10, the sponge 13 comprises an elongated block of cellular rubber or plastic material bonded to one of the narrow sides 16, 17. This construction permits the container 11 to serve as a handle for manipulating the sponge 13 while the relatively stiff side wall economically provides the required rigidity and backing required to make the thin sponge block effective.

The squeegee 14 is preferably economically formed by molding it integrally with the container on the side opposite the sponge and exactly along the parting line 18. It will be appreciated that in this way the squeegee can be simply formed incident to the molding of the container 11 without requiring complicated and expensive molding equipment.

For the purpose of producing a liquid spray to assist in the cleaning operation, the removable spray top 12 is provided with a tube 25 (see Fig. 2) which extends down to the bottom of the container 11 when the top is in position. The tube 25 is effective to conduct liquid from the container, when the latter is compressed, up to the top 12 where a small aperture (not shown) in the top discharges the liquid from the container in the form of a fine spray in a manner conventional with an arrangement of this type. Preferably, the spray top 12 is provided with an attached cover 26 which may be snapped over the opening so as to completely close the container. To removably secure the top to the container neck 11a, these members are provided with cooperating screw threads.

It may be observed at this point that while easy flexibility of the container is convenient for producing a fluid spray, the squeegee 14 must have its working edge 14a maintained in substantially a straight line if it is to function effectively. Thus, if the container tends to buckle and distort when it is used as a handle for the squeegee, the latter will tend to be deflected from its effective straight-line working position.

Accordingly, structural provision is made for mounting the rigid scraper plate 15 adjacent and closely overlying one side wall of the container 11 so that the plate is effective to receive a pressing force and distribute the force over the underlying wall of the container without distorting the container shape. This permits the container to be used as a handle for the squeegee 14 without buckling or distorting the essential straight-line squeegee working edge. As a feature of the invention embodied in the device, the plate 15 is removable and reversible so that it may be extended beyond the container and function as a scraper for clearing ice or the like from windows or other surfaces (see Fig. 3).

To removably but firmly secure the plate 15 in place, it is provided with a right-angled annular mounting flange 27 at one end which defines a central opening 28. The opening is fitted over the container neck 11a so that the flange is sandwiched between a flat shoulder portion 29 on the container and the lower annular edge 31 on the top 12. In the preferred embodiment the mounting flange 27 and scraper plate 15 are integrally formed of a material such as polystyrene.

The operating advantages and structural significance of the disclosed device can be best seen by briefly recounting how the device is intended to be used. It will be appreciated that the unit is small and compact, and by virtue of the sealable top 26 may be safely stored in an accessible location.

To perform a window cleaning operation, the top 26 may be snapped open and the compressible container 11 squeezed to discharge a fluid spray onto the surface to be cleaned. The top 12 may be again sealed with a flick of the finger and the sponge 13 applied to the working surface with the container being used as a handle. It will be recalled that the sponge is mounted on a narrow side of the container 11 over the parting line 18, so that it is economically provided with a fairly stiff backing.

As a final drying operation, the container, now serving as a handle, can be inverted and the squeegee 14 applied to the surface to perform the final drying operation. By applying a pressing force against the scraper plate 15 while using the squeegee, this force is distributed over the entire side wall 21 so that the container-handle does not tend to compress, even when substantially empty of fluid, and the squeegee is thus maintained in its effective straight-line working configuration.

In order to handle extreme cleaning situations, such as snow, ice or mud on the windows of an automobile, the scraper plate 15 is reversed on the container by simply unscrewing the top 12, inverting the mounting flange 27 on the container neck 11a, and re-securing the container top (see Fig. 3). The scraper blade can then be effectively applied, using the container as a handle, to the surface to be cleaned. It will be noted that when the device is so employed, the compressible, resilient nature of the container 11 avoids any tendency to break or snap the scraper from its supporting container-handle. In the present construction the scraper mounting "gives" so as to prevent the build-up of a destructive force.

I claim as my invention:

1. A window cleaning device comprising, in combination, a resiliently compressible container with a mold parting line extending down opposite narrow side walls, said narrow walls with their parting line being relatively more stiff than the adjoining container walls, a narrow block of sponge material bonded along one of said side walls so that the container forms a handle for the sponge block and the relatively stiff side forms a firm backing supporting the sponge, a squeegee formed integrally with said container and located along the side wall parting line opposite said sponge block so that the container forms a handle for the squeegee and the relatively stiff side provides a firm backing supporting the squeegee, and a removable spray top for the container having a small aperture effective for producing a liquid spray when the container is filled with liquid and compressed, said spray top, sponge and squeegee combining with said container in the manner set forth to provide an operator with an economical, single unit, cleaning device.

2. A window cleaning device comprising, in combination, a resiliently compressible container having an externally threaded neck defining an opening, said container having a flat shoulder portion surrounding said neck, a spray top fitted onto said neck, said top having an annular surface overlying said shoulder portion, an integral squeegee formed along one side wall of said container and having a straight-line working edge, and a rigid scraper plate overlying one wall of said container and having an integral annular mounting flange extending at right angles from one end of said plate, said flange being fitted over said neck and sandwiched between said shoulder and said top surface so as to firmly hold the plate in position, said rigid plate being effective to receive a pressure force and distribute it over the underlying wall of the container so as not to distort the container shape, whereby the compressible container may be used as a handle for the squeegee without buckling and distorting the essential straight-line squeegee working edge, said mounting flange also being reversible on said neck so that the plate may extend beyond the container and serve as a scraper.

3. A window cleaning device comprising, in combination, a resiliently compressible container having a neck defining an opening, said container having a flat shoulder portion surrounding said neck, a top fitted onto said neck, said top having an annular surface overlying said shoulder portion, an integral squeegee formed along one side wall of said container and having a working edge, and a rigid plate overlying one wall of said container and having an integral annular mounting flange extending at right angles from one end of said plate, said flange being fitted over said neck and sandwiched between said shoulder and said top surface so as to firmly hold the plate in position, said rigid plate being effective to receive a pressure force and distribute it over the underlying wall of the container so as not to distort the container shape, whereby the compressible container may be used as a handle for the squeegee without buckling and distorting the squeegee working edge.

References Cited in the file of this patent

UNITED STATES PATENTS

| | | |
|---|---|---|
| 749,486 | Huddle | Jan. 12, 1904 |
| 2,587,382 | Pyne | Feb. 26, 1952 |
| 2,707,292 | Lustbader | May 3, 1955 |